United States Patent
Vargantwar et al.

(10) Patent No.: US 9,131,423 B1
(45) Date of Patent: Sep. 8, 2015

(54) METHOD AND SYSTEM FOR WIRELESS COMMUNICATION SETUP WITH THRESHOLD DISTANCE BETWEEN WIRELESS COMMUNICATION DEVICE AND BASE STATION

(75) Inventors: Sachin R. Vargantwar, Overland Park, KS (US); Maulik K. Shah, Overland Park, KS (US); Daniel S. Saska, Coraopolis, PA (US); Michael Erich, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1204 days.

(21) Appl. No.: 13/070,136

(22) Filed: Mar. 23, 2011

(51) Int. Cl.
*H04W 36/00* (2009.01)
*H04W 36/32* (2009.01)
*H04W 64/00* (2009.01)
*H04W 36/36* (2009.01)
*H04W 36/18* (2009.01)
(Continued)

(52) U.S. Cl.
CPC .............. *H04W 36/32* (2013.01); *G01S 5/0263* (2013.01); *G01S 5/06* (2013.01); *G01S 13/878* (2013.01); *G01S 2013/466* (2013.01); *H04L 27/2601* (2013.01); *H04L 41/147* (2013.01); *H04L 67/18* (2013.01); *H04W 36/18* (2013.01); *H04W 36/36* (2013.01); *H04W 64/00* (2013.01); *H04W 76/02* (2013.01)

(58) Field of Classification Search
CPC ....... H04W 64/00; H04W 4/02; H04W 36/32; H04W 36/0083; H04W 36/18; H04W 36/14; H04W 36/08; H04W 36/24; H04W 36/0016; H04W 36/36; H04W 52/0245; H04W 28/08; H04W 36/00; H04W 36/165; H04W 4/021; H04W 28/26; H04W 72/042; H04W 72/1278; H04W 76/02; H04W 28/18; H04W 40/00; H04W 40/02; H04W 72/02; H04W 72/0413; H04W 72/048; H04W 12/06; H04W 16/24
USPC ............ 455/440, 456.1, 515, 435.1; 370/328, 370/331, 335, 329
See application file for complete search history.

(56) References Cited

U.S. PATENT DOCUMENTS 6,075,990 A 6/2000 Shin
6,137,783 A 10/2000 Sallberg
(Continued)

FOREIGN PATENT DOCUMENTS

EP 0 926 844 A2 6/1999

OTHER PUBLICATIONS

Hsiao-Kuang Wu, et al., "Personal Paging area Design Based on Mobile's Moving Behaviors," INFOCOM vol. 1, pp. 21-30, 2001.
(Continued)

*Primary Examiner* — Nimesh Patel

(57) ABSTRACT

Disclosed is a method and system that involves establishing a communication between a wireless device and a base station notwithstanding, and in response to, a determination that the wireless device is threshold far away from the base station. When the base station or its supporting network infrastructure determines that the device is threshold far away from the base station, the base station will simultaneously establish the communication via the base station and at least one other base station. Once adequate communication then occurs through the other base station, the first base station will be dropped from the communication, allowing the communication to proceed though the other base station.

20 Claims, 5 Drawing Sheets

(51) Int. Cl.
| | |
|---|---|
| H04L 29/08 | (2006.01) |
| H04L 12/24 | (2006.01) |
| H04L 27/26 | (2006.01) |
| H04W 76/02 | (2009.01) |
| G01S 13/87 | (2006.01) |
| G01S 5/06 | (2006.01) |
| G01S 5/02 | (2010.01) |
| G01S 13/46 | (2006.01) |

(56) References Cited

U.S. PATENT DOCUMENTS

| | | |
|---|---|---|
| 6,185,421 B1 | 2/2001 | Alperovich et al. |
| 6,208,631 B1 * | 3/2001 | Kim .............................. 370/332 |
| 6,278,881 B1 * | 8/2001 | Balck ............................ 455/444 |
| 6,377,560 B1 | 4/2002 | Dailey |
| 7,076,256 B1 | 7/2006 | Orler et al. |
| 7,180,879 B2 | 2/2007 | Sinnarajah et al. |
| 7,333,797 B2 | 2/2008 | Thorson |
| 7,787,421 B2 | 8/2010 | Ramanna et al. |
| 2003/0035393 A1 | 2/2003 | Sinnarajah et al. |
| 2003/0119535 A1 | 6/2003 | Needham et al. |
| 2004/0110511 A1 | 6/2004 | Schmidt et al. |
| 2006/0068813 A1 | 3/2006 | Ku et al. |
| 2006/0217118 A1 | 9/2006 | Benco et al. |
| 2006/0276197 A1 | 12/2006 | Heo |
| 2007/0258405 A1 * | 11/2007 | Kim et al. ...................... 370/331 |
| 2008/0062891 A1 | 3/2008 | Van der Merwe et al. |
| 2008/0076436 A1 | 3/2008 | Sanders et al. |
| 2008/0146252 A1 | 6/2008 | Razdan et al. |
| 2009/0323604 A1 | 12/2009 | De Jaeger et al. |
| 2012/0276914 A1 * | 11/2012 | Talley et al. ................... 455/450 |
| 2014/0038614 A1 * | 2/2014 | Diachina et al. ............... 455/437 |

OTHER PUBLICATIONS

I.F. Akyildiz, et al., Abstract of "Movement-Based Location Update and Selective paging for PCSnetworks," Networking, IEEE/ACM Transactions, vol. 4, Issue 4, p. 629, Aug. 1996.
U.S. Appl. No. 11/810,665, filed Jun. 6, 2007.
Office Action from U.S. Appl. No. 11/810,665, dated Oct. 5, 2010.
Office Action from U.S. Appl. No. 11/810,665, dated Feb. 17, 2011.
Office Action from U.S. Appl. No. 11/810,665, dated Aug. 29, 2011.
Notice of Allowance from U.S. Appl. No. 11/810,665, dated Mar. 27, 2012.
Office Action from U.S. Appl. No. 13/531,083, dated May 2, 2013.
Notice of Allowance from U.S. Appl. No. 13/531,083, dated May 19, 2014.
U.S. Appl. No. 13/531,083, filed Jun. 22, 2012.

* cited by examiner

METHOD AND SYSTEM FOR WIRELESS COMMUNICATION SETUP WITH THRESHOLD DISTANCE BETWEEN WIRELESS COMMUNICATION DEVICE AND BASE STATION

BACKGROUND

In a typical cellular wireless communication system, a wireless carrier operates a radio access network (RAN) comprising a number of base transceiver stations (base stations) or other such access points positioned at various locations throughout a region. Each base station includes an antenna or antenna arrangement that radiates to define one or more coverage areas such as a cell or cell sectors. Further, each base station may be coupled with other RAN infrastructure to ultimately provide a connection with a transport network such as the public switched telephone network (PSTN) or the Internet. With this arrangement, when a wireless communication device (WCD) is positioned within one of the RAN coverage areas, the WCD can engage in air interface communication with the base station serving the coverage area and in turn with other served WCDs or with entities on the transport network.

In practice, a WCD such as a cell phone, portable computer or other wirelessly equipped device will regularly monitor pilot signals emitted by base stations in various coverage areas, in search of a coverage area having a strongest pilot signal. The WCD will then "idle" in that coverage area, monitoring overhead air interface channels to obtain system information and any applicable page messages, and awaiting a network or user directive to initiate a communication such as a voice call or data session. When the WCD then seeks to initiate a communication, the WCD may transmit an access probe message to the base station serving that coverage area. In response, the RAN may then assign air interface traffic channel resources and/or take other action to establish a connection so that the WCD may proceed with the communication.

If a WCD is very far away from a base station when the WCD engages in an active communication (e.g., voice call or data session) via the base station, both the WCD and the base station will need to communicate with particularly high transmission power. Such high powered transmissions can consume a disproportionate amount of base station power resources and can interfere with other communications being carried out in the coverage area and perhaps in adjacent coverage areas. To help avoid or minimize those problems, a base station or its supporting RAN infrastructure may be programmed to reject communication requests from WCDs that are considered too far away from the base station, such as farther than a particular "cell radius" from the base station.

To facilitate this, in certain systems, a WCD will include within its access probe information that indicates how far away the WCD is from the base station. For instance, the WCD may include in its access probe a measurement of pilot signal delay (e.g., chip delay), i.e., how long it takes a pilot signal from the base station to reach the WCD, which would correlate with a distance between the base station and the WCD. The RAN may then compare the indicated distance with a cell radius threshold to determine whether to allow the requested communication to be established. If the RAN determines that the indicated distance is within the cell radius, then the RAN may grant the request. However, if the RAN determines that the indicated distance is beyond the cell radius, then the RAN may reject the request.

OVERVIEW

In a scenario where a WCD is too far from a base station operated by the WCD's wireless carrier and the base station therefore rejects a communication request from the WCD, the WCD may responsively begin roaming, i.e., seeking service in another carrier's network instead. In general, such roaming is undesirable for a number of reasons, including possibly reduced profitability for the home carrier and lack of access to home carrier services and support.

There may be situations, however, where a WCD is outside the cell radius of the base station with which the WCD seeks a connection but where there are one or more other home carrier base stations that could potentially serve the WCD—if not right away, then perhaps shortly, or perhaps right away but with lower quality.

By way of example, consider a scenario where a WCD's home carrier operates base station A on a mountain top. Base station A may radiate to define a coverage area having a particular cell radius threshold but, due to its position on the mountain top, may emit a pilot signal that covers a broad range extending well beyond the cell radius. Assume then that the WCD is within clear range of the pilot signal but is positioned beyond the cell radius. At the same time, the home carrier may also operate another base station B that is closer to the WCD, but due to various obstructions or other issues, the WCD is receiving a weaker pilot signal from base station B than from base station A.

In that scenario, the WCD may seek to initiate a communication with base station A due to the stronger pilot signal of base station A, but base station A may reject the request since the WCD is beyond the cell radius of the coverage area. As a result, under common practice, the WCD may then begin searching for a roaming system to use, notwithstanding the fact that there is at least one closer home base station that could theoretically serve the WCD, albeit with possibly lower quality.

Disclosed herein is a particular method and corresponding system for helping to address this problem. The method makes use of a "Channel Assignment Into Soft Handoff" (CASHO) mechanism together with a subsequent conditional dropout of the coverage area whose base station was indicated at the time of communication setup to be threshold distant from the WCD.

In particular, according to the method, when base station A receives a communication request from a WCD, the RAN (e.g., base station A) will detect that the WCD is more than a threshold distance (e.g., cell radius) away from base station A and will detect that the WCD is closer (perhaps within threshold distance) to another base station, base station B. In response, the RAN will take the unconventional action of granting the WCD's communication request and will set up the communication through base station A, notwithstanding the determination that the WCD is threshold distant from base station A. But also in response, the RAN will concurrently set up the communication through base station B as well. According to the method, if and when base station B then begins to receive adequate communication from the WCD, base station A will then drop out, i.e., stop serving the WCD, and the WCD will continue the communication through base station B.

Although this process may temporarily add some undesired noise into the coverage area of base station A as a result of base station A having to serve a threshold distant WCD at a high power level, the process can advantageously help prevent roaming. In some or all cases, this tradeoff may be justified, as there may be reduced roaming costs and better service and support, and the possibly added noise in the coverage area of base station A would be temporary.

These as well as other aspects, advantages, and alternatives will become apparent to those of ordinary skill in the art by reading the following detailed description, with reference where appropriate to the accompanying drawings. Further, it should be understood that the disclosure provided by this overview and the other description throughout this document is intended to illustrate the invention by way of example only and that numerous variations may be possible.

DETAILED DESCRIPTION

Figure 1:
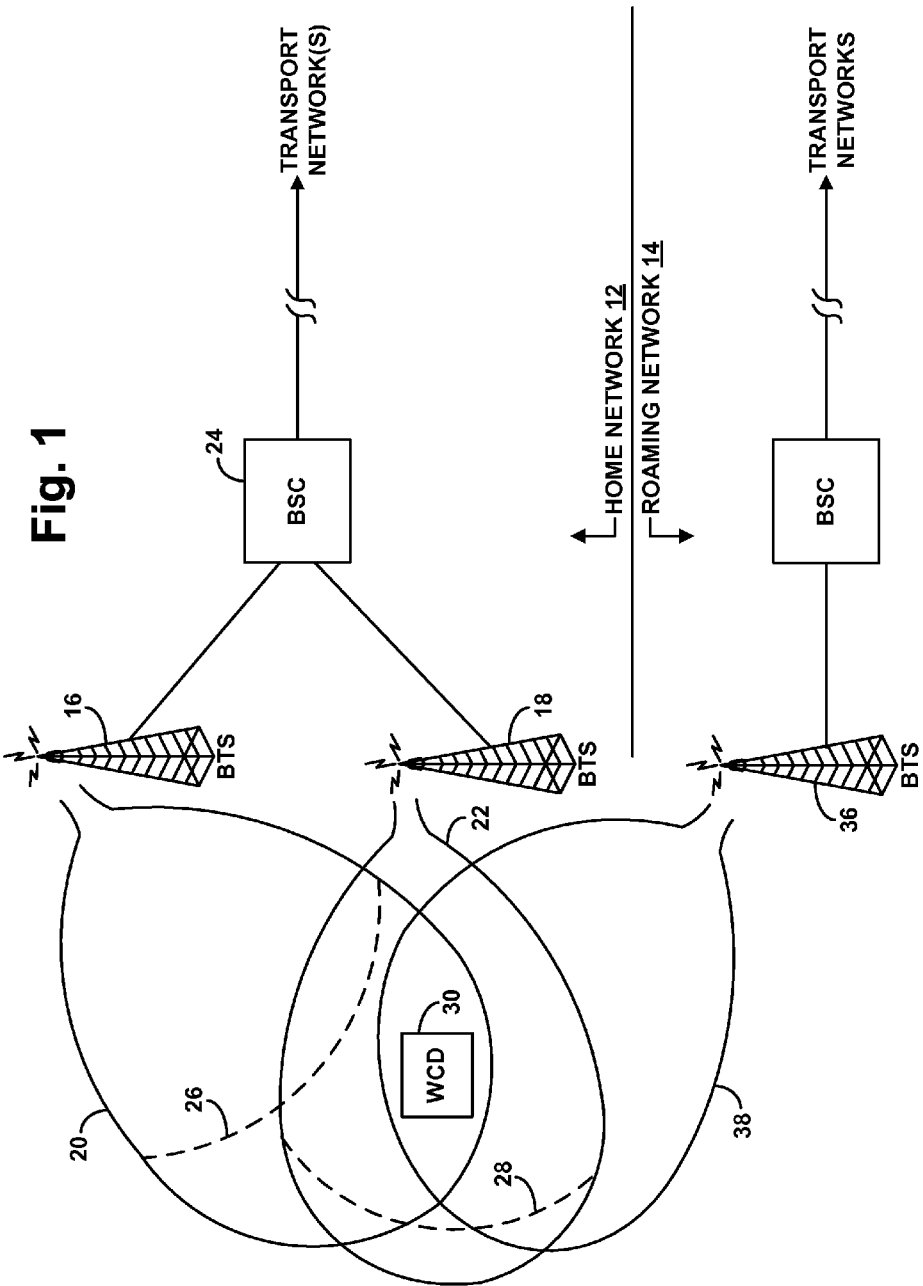
FIG. 1 is a simplified block diagram of an example wireless communication system in which the present method can be implemented.

Referring to the drawings, as noted above, FIG. 1 is a simplified block diagram of an example wireless communication system in which the present method can be implemented. As shown, the system includes a representative home network 12 operated by a home carrier and a representative roaming network 14 operated by a roaming carrier (e.g., a roaming partner of the home carrier).

The home network 12 is shown including two representative base stations 16, 18, each of which radiate to define at least one representative coverage area 20, 22, and both of which are controlled by a common base station controller (BSC) 24. The illustrated scope of each coverage area is defined by the propagation distance of the pilot signal in the coverage area. Further, each base station is programmed to apply a particular cell radius or other distance threshold, which may differ from coverage area to coverage area and may be shorter than the illustrated pilot signal scope in some directions of radiation. The figure illustrates an example cell radius in each coverage area by a dashed line 26, 28.

Each coverage area, and the associated network equipment, may operate according to a defined air interface protocol, examples of which include CDMA (e.g., 1xRTT, 1xEV-DO), WiMAX, LTE, IDEN, GSM, HSDPA, TDMA, and others now known and later developed. Through a mechanism such as code division multiplexing, time division multiplexing, and/or frequency division multiplexing, the air interface protocol may define various air interface channels for communication with WCDs, including channels in a forward direction from the base station to WCDs and channels in a reverse direction from WCDs to the base station.

The coverage areas 20, 22 of base stations 16, 18 are shown overlapping in part, to allow for handoff as a WCD moves from one coverage area to another. The figure then depicts a representative WCD 30 positioned in the overlap area and thus able to detect pilot signals from both base station 16 and base station 18. In the arrangement shown, base station 16 is farther away from the WCD. However, we can assume for sake of discussion that WCD 30 will for one reason or another detect a stronger pilot signal from base station 16 than from base station 18. This difference in signal strength, for instance, may be due to difference in vertical positioning or size of the base station antennas and/or obstructions between base station 18 and the WCD. Further, as illustrated by way of example, we can assume that, although the WCD is able to detect the pilot signal of each coverage area 20, 22, the WCD is outside the cell radius of coverage area 20 but is perhaps within the cell radius of coverage area 22.

Figure 2:
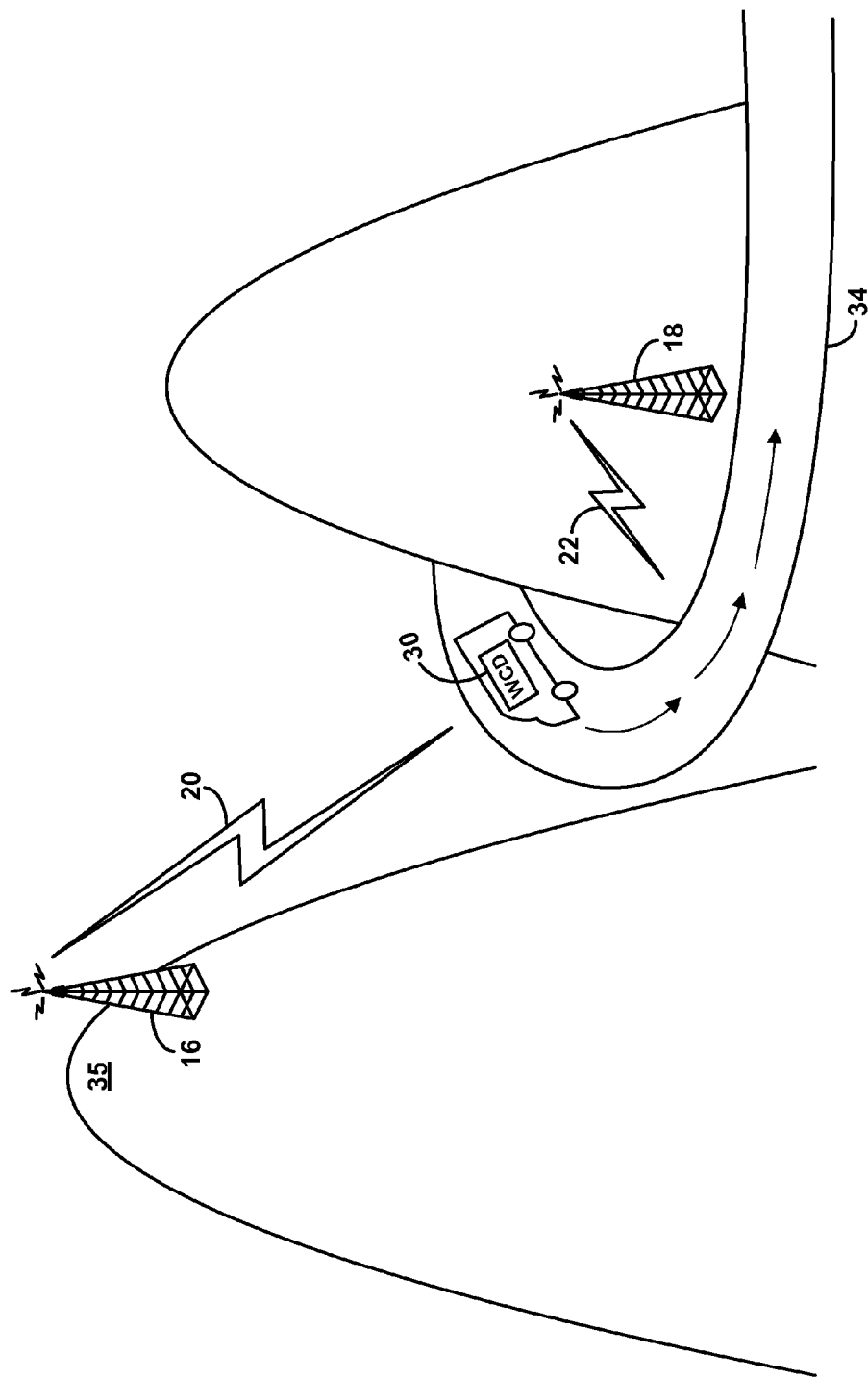
FIG. 2 is an illustration of example scenario in which the present method may be applied.

FIG. 2 depicts an example of this scenario in line with the discussion above, where WCD 30 is in a motor vehicle 32 driving along a roadway 34 in a mountain range or other hilly or mountainous area. The figure further depicts base station 16 high up on a mountain top 34, providing broad coverage that covers WCD 28 even though the WCD is beyond the cell radius 26 of coverage area 20. Further, the figure depicts base station 18 just around the bend of the roadway, providing coverage that also extends to WCD 30 but provides the WCD with a weaker pilot signal due to topography and other obstructions. Thus, in this scenario, the WCD may detect a stronger pilot signal from base station 16 than from base station 18, even though the WCD is outside of the cell radius of base station 16 and is closer to base station 18.

Turning back to FIG. 1, roaming network 14, in turn, is shown including a representative base station 36, which radiates to define at least one representative coverage area 38 also extending to cover WCD 30. Thus, roaming coverage area 38 overlaps in part with home coverage areas 20, 22 and could theoretically serve the WCD if the WCD for some reason opts to roam.

In a typical system, a WCD will be programmed with a preferred roaming list (PRL) or the like that will list various systems (e.g., by frequency and system identifier) in an order of priority set by the home carrier. When the WCD initially enters or power on in a region, the WCD may scan the airwaves in search of a system, in the priority order listed in the PRL. Upon finding a system, the WCD may then search for a strongest pilot signal on which to idle as noted above.

To foster use of home coverage rather than roaming, a PRL will typically list home carrier systems with higher priority than roaming carrier systems. Thus, a WCD will preferably find a home system if one exists and will attempt to establish communication in that home system. If the WCD fails in its effort to establish communication in the home system, the WCD may then resort to attempting communication in a roaming carrier system instead.

Accordingly, in the arrangement shown in FIG. 1, WCD 30 would preferably detect the presence of its home carrier system, and the WCD would detect pilot signals from both home base station 16 and home base station 18 and may determine that the pilot signal from base station 16 is stronger, notwithstanding the fact that base station 18 may be closer to the WCD. The WCD may therefore idle on coverage area 20. When the WCD seeks to initiate a communication, the WCD may then send an access probe to base station 16 in coverage area 20, since that is the coverage area whose pilot signal the WCD determined was strongest. That access probe may then be handled by base station 16 or, depending on implementation, by BSC 24.

In practice, the WCD may include in its access probe indications of distance (e.g., chip delay) for each of the strongest pilot signals that the WCD detects. Thus, in the arrangement of FIG. 1, the WCD may include in its access probe an indication of its distance from base station 16 (coverage area 20) and an indication of its distance from base station 18 (coverage area 22). In normal practice, base station 16 or BSC 24 may only be interested in the distance indication for base station 16, since a comparison of that distance indication with the cell radius of coverage area 20 would establish whether the WCD is threshold far away such that the base station should reject the WCD's request to establish communication in coverage area 20. The remaining distance indication data may be usefully stored by the RAN, however, for purposes of subsequent network planning for instance.

In operation, when base station 16 receives the request from WCD 30 to initiate communication, base station 16 or BSC 24 may thus reject the request because the WCD is beyond the cell radius of coverage area 20. As a result, WCD 28 may then refer to its PRL to find a next listed system, which may lead WCD 30 to begin roaming. In particular, the WCD may detect a pilot signal from roaming base station 36 and may then send an access probe to base station 36 in roaming coverage area 38, and base station 36 or its supporting network infrastructure may grant the request and begin serving the WCD.

The present method helps to avoid such roaming, while still managing noise in the broader coverage area 22, by instead invoking a CASHO mechanism together with a subsequent planned dropout of coverage area 22. By way of example, when base station 16 receives the WCD's initiation request, base station 16 or BSC 24 will determine from the distance indication provided in the request that the WCD is beyond the cell radius of coverage area 20. But rather than conventionally rejecting the request as a result of that determination, base station 16 will responsively grant the request and will establish the communication in coverage area 20 but, in response to the determination, base station 16 or BSC 24 will also concurrently arrange for setup of the communication in coverage area 22 served by base station 18 (and perhaps in one or more other coverage areas). In turn, when base station 18 begins adequately receiving bearer traffic communications from the WCD in coverage area 22, such as by receiving a sufficient number of decodable traffic frames for instance, BSC 24 will drop the connection in connection in coverage area 20, leaving the communication to continue in coverage area 22.

In general, the CASHO process is applicable in a wireless communication system that allows a WCD to engage in communication concurrently via multiple coverage areas or in a system that can be structured or modified to allow such concurrent communication, perhaps regardless of how successful the communication in each coverage area is. An example of such a system is Code Division Multiple Access (CDMA), but other examples may exist as well.

Concurrent communication with a WCD in multiple coverage areas may involve the RAN transmitting copies of the same bearer data to the WCD simultaneously via traffic channels of each of two or more coverage areas. This approach can increase the likelihood that the WCD will receive at least one copy of the bearer data. Additionally, the WCD may be able to combine two or more received copies of the bearer data such that the WCD can decode the received bearer data more reliably than if the WCD received only one copy of the bearer data. An analogous procedure may be used for bearer data transmitted by the WCD to the RAN.

The coverage areas with which a WCD is actively communicating may be referred to in the aggregate as the WCD's active set, and each coverage area may be considered a member of the active set of a leg of the WCD's active communication. As the WCD moves from place to place, or as the signal strengths that the WCD receives from members of its active set fluctuate, the RAN may add members to or remove members from the active set. The process of doing so is considered a soft handoff.

While soft handoff procedures are typically used during an active communication session, CASHO provides for the RAN to assign traffic channels from multiple wireless coverage areas to a WCD at the beginning of a communication session. This technique may improve initial communication quality, thereby increasing user satisfaction with the wireless service.

Figure 3:
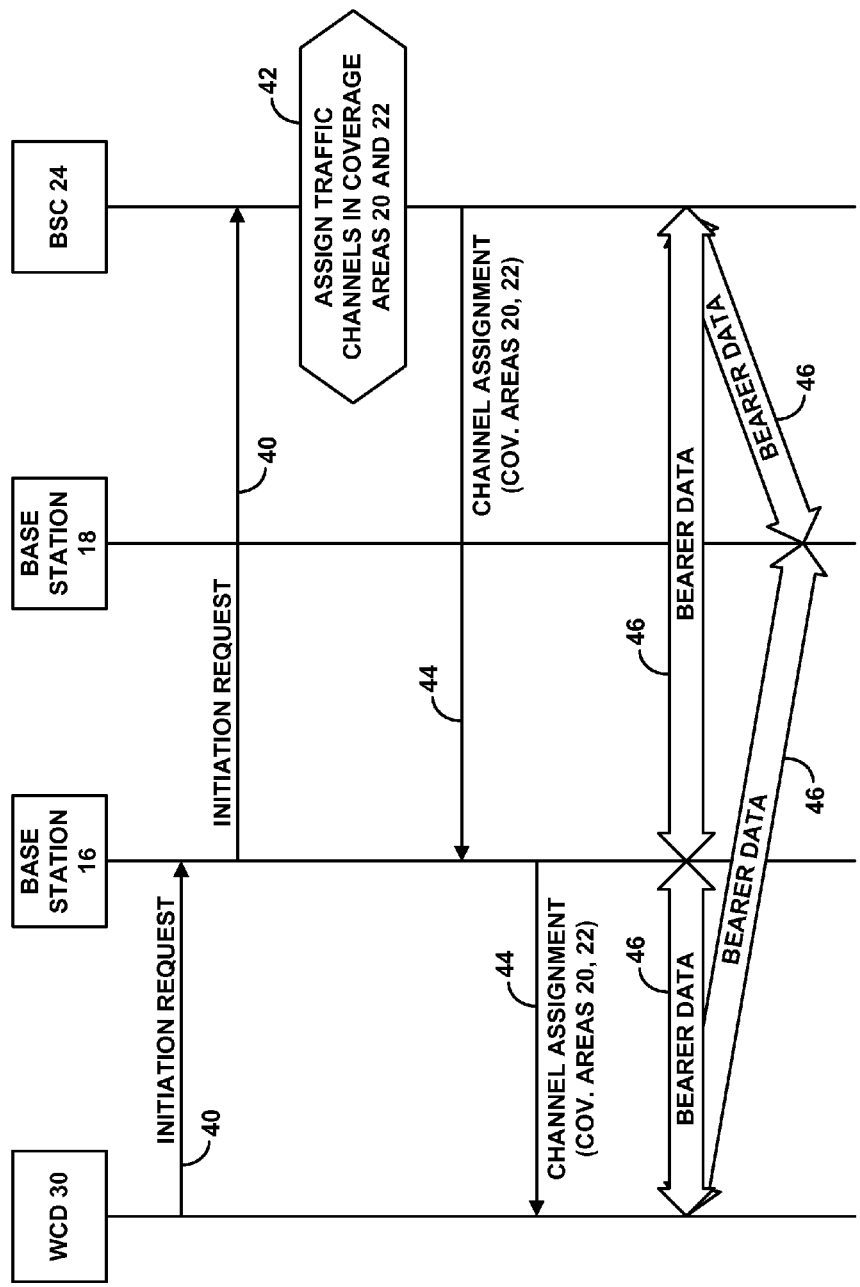
FIG. 3 is a message flow diagram depicting a CASHO process.
Figure 4:
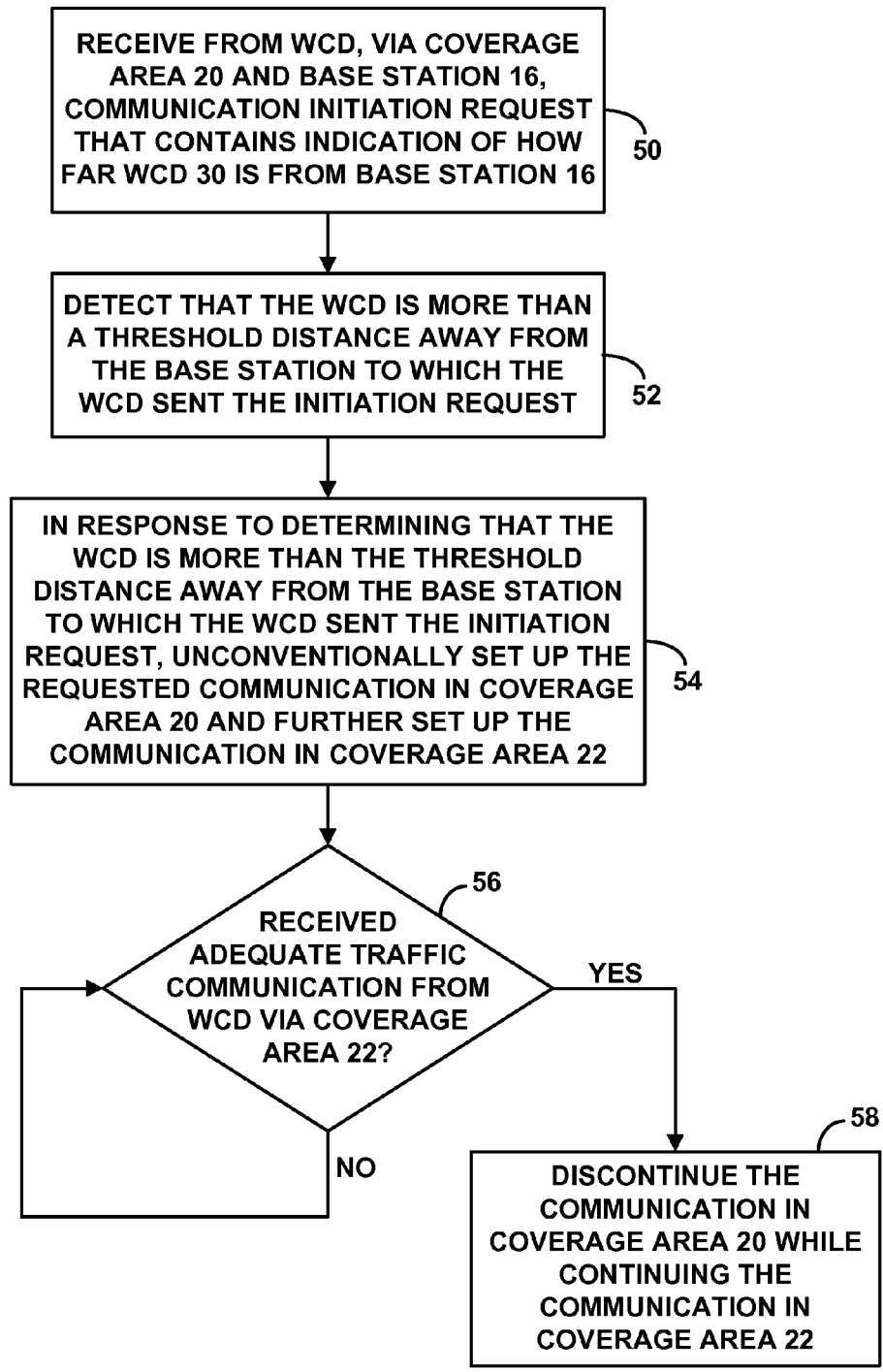
FIG. 4 is a flow chart depicting functions that can be carried out in accordance with the present method.

FIG. 3 depicts message flow in an example CASHO process. FIG. 4 involves WCD 30, base station 16, base station 18, and BSC 24. In general, WCD 30 may be able to receive pilot signals of sufficient strength from both base station 16 for coverage area 20 and base station 18 for coverage area 22, such that the WCD could communicate effectively via either of these coverage areas. Preferably, the WCD reports to BSC 24 the signal strengths (e.g., signal to noise ratio or the like) at which the WCD receives pilot signals for the respective coverage areas. For instance, the WCD may report those pilot signal strengths to the BSC in a registration message that the WCD sends to register in a strongest coverage area or in some other sort of radio environment report, and/or the WCD may report the pilot strengths in an communication initiation request. Further, we can assume that the WCD has determined that the pilot signal from base station 16 for coverage area 20 is the strongest, and the WCD is therefore idling in that coverage area.

As shown in FIG. 3, at step 40, when the WCD seeks to initiate a communication (e.g., in response to user request or network request), the WCD transmits an initiation request (e.g., origination message) in coverage area 20 to base station 16, which base station 16 passes along to BSC 24. This initiation request may seek establishment of an outgoing voice call, data session, or other type of communication, and the WCD may send the request to base station 16 via a defined air interface access channel in coverage area 20. Further, the initiation request may carry data that specifies or otherwise indicates the pilot signal strength that the WCD detected for each of the strongest pilot signals the WCD detected (including those for coverage area 20 and coverage area 22), and that specifies or otherwise indicates the distance (e.g., chip delay) from each respective base station to the WCD, determined by the WCD through known procedures.

At step 42, BSC 24 assigns multiple traffic channels to WCD 30. In particular, BSC 24 may assign one traffic channel from coverage area 20, and another traffic channel from coverage area 22, to WCD 30, in accordance with CASHO procedures. When making the traffic channel assignment, BSC 24 may consider pilot signal strength measurements that it received from WCD 30, as a basis to determine which coverage areas to include in the CASHO process. In this example, we can assume that the BSC 24 determines the pilot signal strengths detected by the WCD in coverage areas 20 and 22 are both sufficient, and so the BSC 24 may programmatically decide to use CASHO to assign traffic channels to the WCD simultaneously in both coverage areas 20 and 22.

At step 44, BSC 24 may thus transmit a channel assignment message (CAM) or enhanced channel assignment message (ECAM) via base station 20 to WCD 30. The CAM or ECAM may include traffic channel assignments for both coverage area 20 and coverage area 22. For instance, the CAM or ECAM may instruct WCD 30 to use a particular coded or otherwise identified traffic channel to communicate with the RAN in coverage area 20 and another particular coded or otherwise identified traffic channel to communicate with the RAN in coverage area 22.

Accordingly, at step 46, WCD 30 may begin transmitting and receiving bearer data via both base station 16 (coverage area 20) and base station 18 (coverage area 22). Thus, via both base station 16 and base station 20, WCD 30 may receive forward direction bearer data streams from BSC 24, and may combine these streams into a single stream of bearer data. This combining may involve WCD 30 adding the signals it receives from base station 16 and base station 18, to form a combined signal, or selecting the best of those signals on a per frame basis or the like. Conversely, via both base station 16 and base station 18, BSC 24 may receive reverse direction bearer data streams from WCD 30, and may also combine or otherwise process those streams into a single stream of bearer data.

FIG. 4 is next a flow chart depicting functions that can be carried out in accordance with the present method. These functions may be carried out by a RAN entity such as BSC 24 or perhaps by base station 16 provided the base station has the ability to itself assign traffic channel resources of another base station or to work with another base station to facilitate such assignment, and to determine when the other base station begins to communicate sufficiently with the WCD. For simplicity and without limitation, the following discussion will assume that BSC 24 is the entity that carries out some or all aspects of the method.

As shown in FIG. 4, at block 50, BSC 24 receives from WCD 30, via coverage area 20 and base station 16, a communication initiation request that contains at least an indication (e.g., chip delay) of how far the WCD 30 is from base station 16. Further, the initiation request may also contain an indication (e.g., chip delay) of how far the WCD is from a second strongest base station 18 in coverage area 22. Still further, the initiation request may also contain pilot signal strength measurements (e.g., signal to noise ratios) for each of the indicated coverage areas.

At block 52, the BSC detects that the WCD is more than a threshold distance away from the base station to which the WCD sent the initiation request. For instance, the BSC may use the distance indication that the initiation request provides for base station 16 as a basis to determine the distance between the WCD and base station 16, such as by correlating chip delay with distance. Alternatively, the BSC may apply or cause to be applied any suitable location-determine techniques (e.g., assisted GPS location determination) to determine the location of the WCD and may compare that location with a known location of base station 16 to determine a distance between the WCD and based station 16. The BSC may then determine whether that distance exceeds cell radius 26 of coverage area 20. If so, the BSC may conclude that the WCD is threshold far away from the base station to which the WCD sent the initiation request. Otherwise, the BSC may conclude that the WCD is not threshold far away from the base station to which the WCD sent the initiation request.

At block 54, in response to determining that the WCD is more than the threshold distance away from the base station to which the WCD sent the initiation request, the BSC may then unconventionally set up the requested communication in coverage area 20 and further set up the communication in coverage area 22. To do this, the BSC may apply the CASHO process discussed above, sending to the WCD via base station 16 a CAM or ECAM that assigns traffic channels in both coverage area 20 and coverage area 22.

As a condition to assigning a traffic channel to the WCD concurrently in coverage area 22, the BSC may first determine that the WCD is threshold close to base station 18 that serves coverage area 22. To do this, the BSC may evaluate the distance indication (e.g., chip delay) that the initiation request provides for coverage area 22 to determine the distance between the WCD and base station 18, and the BSC may compare that distance with a cell radius or other such threshold that the BSC is set to apply for coverage area 22. Alternatively, the BSC may apply or cause to be applied any suitable location-determine techniques (e.g., assisted GPS location determination) to determine the location of the WCD and may compare that location with a known location of base station 18 to determine a distance between the WCD and based station 18, and the BSC may similarly compare that distance with a cell radius or other threshold that the BSC is set to apply for coverage area 22. Through that comparison, the BSC may thereby determine that WCD is within the cell radius (i.e., not positioned beyond the cell radius) from base station 18. The BSC may decide to assign a traffic channel to the WCD in coverage area 22 in response to the initiation request sent to base station 16, provided that the BSC has determined that the WCD is threshold close enough to base station 18. Alternatively, the BSC might not require this condition to be met.

As another or alternative condition to assigning a traffic channel to the WCD concurrently in coverage area 22, the BSC may determine that the WCD detected a threshold strong enough pilot signal from base station 18 that serves coverage area 22. For instance, the BSC may programmatically require that the reported signal strength of coverage area 22 is sufficiently high alone or compared with the reported signal strength of coverage area 20 as a condition to the BSC deciding to assign traffic channels concurrently in both coverage area 20 and coverage area 22. The BSC may apply other conditions, or variations of these conditions as well.

As a result of the BSC assigning traffic channels to the WCD in both coverage area 16 and coverage area 18, the WCD may proceed with the requested communication concurrently via coverage area 16 and coverage area 18. This communication may initially work well in both coverage areas, or it may initially work well only in one of the coverage areas, such as just in coverage area 20 for instance, or just in coverage area 22 for instance.

In accordance with the method, at block 56, upon assigning traffic channels to the WCD in both of the coverage areas, the BSC will then wait until the BSC begins to receive adequate traffic communication from the WCD via coverage area 22, to determine when to release the communication leg in coverage area 20. For instance, the BSC may monitor errors or other quality of bearer traffic frames that the BSC receives via base stations 16 and 18 from the WCD, and may thereby detect when the BSC has received a defined threshold number of good (e.g., error free, or threshold error free) traffic frames from the WCD via base station 18. Alternatively or additionally, base station 18 may report to BSC the strength at which base station 18 receives communications from WCD 30 in coverage area 22, and BSC may determine if that receive signal strength is at least as high as a defined threshold indicating adequate traffic communication via coverage area 22. As shown in the figure, until the BSC detects sufficient traffic communication from the WCD via base station 18, the function of block 56 repeats.

Once the BSC detects adequate traffic communication from the WCD via base station 18, a reasonable conclusion is that the WCD is communicating sufficiently with base station 18 via coverage area 22, and that it would be alright to drop coverage area 20 from the WCD's active set. Thus, in response to detecting adequate traffic communication from the WCD via base station 18, the BSC will drop coverage area 20 from the WCD's active set, thus releasing traffic channel resources that had been reserved for use to serve the WCD in coverage area 20. To drop coverage area 20 from the WCD's active set, the BSC may transmit to the WCD via any or all of the WCD's active set members a handoff direction message (HDM) that gives the WCD a new active set excluding coverage area 20 or the specifically directs the WCD to stop communicating in coverage area 20. And the WCD may respond to such a directive by discontinuing communication with base station 16 via coverage area 20, while continuing communication with base station 18 via coverage area 22.

Dropping coverage area 20 from the WCD's active set may advantageously help reduce the level of noise in coverage area 20, as it would discontinue the potentially high power communication between base station 16 and distant WCD 30. Given this rationale, the BSC may condition dropping coverage area 20 from the WCD's active set on a determination that the WCD is still threshold far from base station 16. To do this in practice, the BSC may receive an updated indication of distance between the WCD and base station 16, such as a chip delay indication that the WCD provides in a pilot strength management message (PSMM) during the active communication, and the BSC may compare the indicated distance with the cell radius of coverage area 20 and thereby determine that the WCD is still beyond the cell radius of coverage area 20. Alternatively, the BSC might not require this condition to be met.

Figure 5:
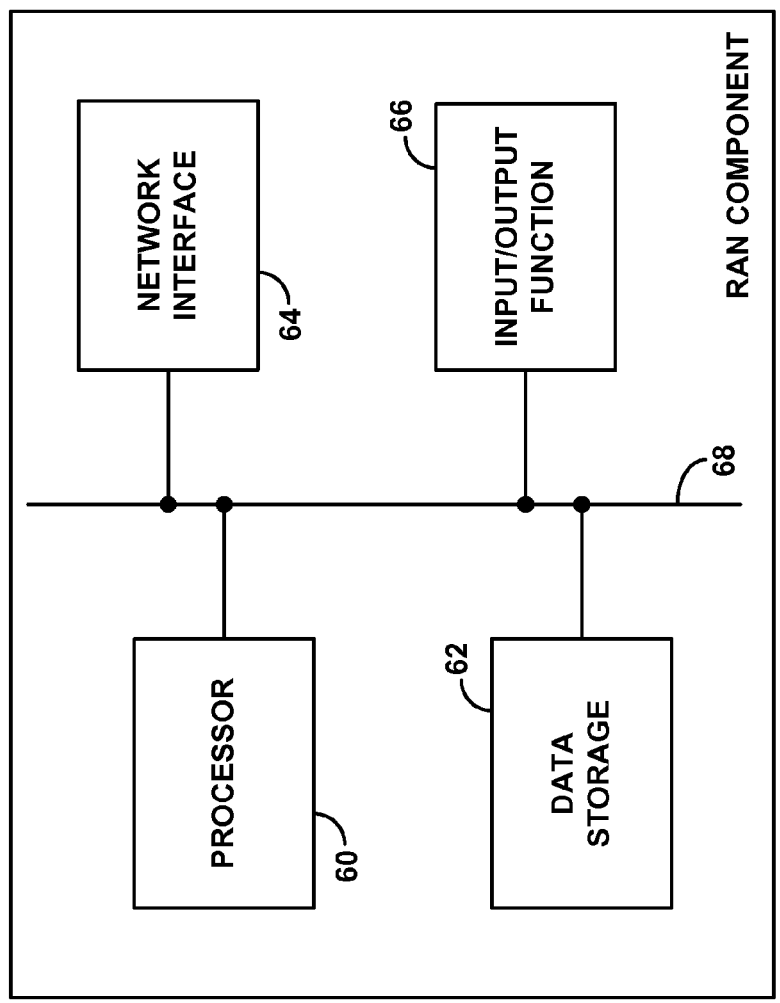
FIG. 5 is a simplified block diagram of a RAN component for carrying out the present method.

FIG. 5 is next a simplified block diagram showing some of the components that can be included in a RAN component such as BSC 24 to implement this method in practice. It should be understood that these components could be provided elsewhere, perhaps across multiple RAN entities, and in any particular arrangement, and that some components can be omitted or can take forms other than as described.

As shown in FIG. 5, the example RAN component includes a processor 60, data storage 62, a network interface 64, and an input/output function 66, all of which may be coupled by a system bus 310 or a similar mechanism.

Processor 60 may include one or more CPUs, such as one or more general purpose processors and/or one or more dedicated processors (e.g., application specific integrated circuits (ASICs) or digital signal processors (DSPs), etc.)

Data storage 62, in turn, may comprise volatile and/or non-volatile data storage and can be integrated in whole or in part with processor 60. Data storage 62 may store program instructions, executable by processor 60, and data that is manipulated by these instructions to carry out the various methods, processes, or functions described herein. Alternatively, these methods, processes, or functions can be defined by hardware, firmware, and/or any combination of hardware, firmware and software. Therefore, data storage 62 may be a non-transitory computer-readable medium, having stored thereon program instructions that, if executed by a computing device, cause the computing device to carry out any of the methods, processes, or functions disclosed in this specification or the accompanying drawings.

Network interface 64 may take the form of a wireline connection, such as an Ethernet, Token Ring, or T-carrier connection. Network interface 64 may also take the form of a wireless connection, such as IEEE 802.11 (Wifi), BLUETOOTH®, or a wide-area wireless connection. However, other forms of physical layer connections and other types of standard or proprietary communication protocols may be used over network interface 306. Furthermore, network interface 64 may comprise multiple physical interfaces.

Input/output function 66 may facilitate user interaction with example the RAN component. Input/output function 66 may comprise multiple types of input devices, such as a keyboard, a mouse, a touch screen, and so on. Similarly, input/output function 66 may comprise multiple types of output devices, such as a monitor, printer, or one or more light emitting diodes (LEDs). Additionally or alternatively, the example RAN component may support remote access from another device, via network interface 66 or via another interface (not shown), such an RS-232 or Universal Serial Bus (USB) port.

An exemplary embodiment of the present invention has been described above. Those of ordinary skill in the art will appreciate that numerous variations from the embodiment described are possible, while remaining within the spirit and scope of the invention.

We claim:

1. In a radio access network (RAN) having a plurality of base stations including at least a first base station radiating to define a first coverage area and a second base station radiating to define a second coverage area, a method comprising:
    receiving into the first base station via the first coverage area from a wireless communication device (WCD) a communication initiation request seeking initiation of communication; and
    responsive to the communication initiation request, the RAN determining that the WCD is threshold distance threshold far away from the first base station, and in response to at least the determining, (i) the RAN establishing the communication simultaneously in the first coverage area and in the second coverage area, (ii) the RAN waiting to detect that the second base station has received adequate bearer traffic from the WCD via the second coverage area, and (iii) responsive to detecting that the second base station has received adequate bearer traffic from the WCD via the second coverage area, the RAN discontinuing the communication in the first coverage area while allowing the communication to continue in the second coverage area.

2. The method of claim 1, wherein the initiation request carries an indication of distance between the first base station and the WCD, and wherein determining that the WCD is threshold far away from the first base station comprises comparing the indicated distance with a distance threshold.

3. The method of claim 2, wherein the indication of distance comprises an indication of how long it takes for a pilot signal from the first base station to reach the WCD, whereby the indication of how long it takes for the pilot signal from the first base station to reach the WCD corresponds with distance between the first base station and the WCD.

4. The method of claim 2, wherein the distance threshold is a cell radius.

5. The method of claim 2, wherein the initiation request further carries an indication of distance between the second base station and the WCD, the method further comprising conditioning step iii on a determination that the WCD is threshold close to the second base station.

6. The method of claim 5, wherein conditioning step iii on a determination that the WCD is threshold close to the second base station comprises, during the established communication, receiving from the WCD an updated indication of distance between the second base station and the WCD, and using the received updated indication as a basis to determine that the WCD is threshold close to the second base station.

7. The method of claim 2, wherein the initiation request further carries an indication of WCD received signal strength for the second coverage area, the method further comprising conditioning step iii on a determination that indicated received signal strength for the second coverage area is threshold high enough.

8. The method of claim 1, wherein determining that the WCD is threshold far away from the first base station comprises using a location of the WCD and a location of the first base station to determine a distance between the WCD and the first base station, and comparing the determined distance with a distance threshold.

9. The method of claim 1, wherein establishing the communication simultaneously in the first coverage area and in the second coverage area comprises applying a channel assignment into soft handoff (CASHO) process.

10. The method of claim 1, wherein waiting to detect that the second base station has received adequate bearer traffic from the WCD via the second coverage area comprises waiting to determine that the second base station has received a threshold number of good traffic frames from the WCD via the second coverage area.

11. The method of claim 1, wherein discontinuing the communication in the first coverage area while allowing the communication to continue in the second coverage area comprises sending to the WCD a directive to discontinue the communication in the first coverage area.

12. In a radio access network (RAN) having a plurality of base stations including at least a first base station radiating to define a first coverage area and a second base station radiating to define a second coverage area, a method comprising:
receiving into the first base station via the first coverage area from a wireless communication device (WCD) a communication initiation request seeking initiation of communication, the initiation request carrying an indication of distance between the first base station and the WCD; and
responsive to the communication initiation request, the RAN determining based on the distance indication that the WCD is threshold far away from the first base station, and in response to at least the determining, (i) the RAN engaging in a channel assignment into soft handoff process to assign traffic channels for the communication concurrently in the first coverage area and second coverage area, (ii) the RAN waiting to detect that the second base station has received a threshold extent of good traffic frames from the WCD via the second coverage area, and (iii) responsive to detecting that the second base station has received the threshold extent of good traffic frames from the WCD via the second coverage area, the RAN sending to the WCD a directive for the WCD to discontinue the communication in the first coverage area but the RAN allowing the communication to continue in the second coverage area.

13. In a radio access network (RAN) having a plurality of base stations including at least a first base station radiating to define a first coverage area and a second base station radiating to define a second coverage area, a system comprising:
a processor;
data storage; and
program instructions stored in the data storage and executable by the processor to carry out functions comprising:

(a) receiving via the first base station and the first coverage area from a wireless communication device (WCD) a communication initiation request seeking initiation of communication, and
(b) responsive to the communication initiation request, determining that the WCD is threshold far away from the first base station, and in response to at least the determining, (i) establishing the communication simultaneously in the first coverage area and in the second coverage area, (ii) waiting to detect that the second base station has received adequate bearer traffic from the WCD via the second coverage area, and (iii) responsive to detecting that the second base station has received adequate bearer traffic from the WCD via the second coverage area, discontinuing the communication in the first coverage area while allowing the communication to continue in the second coverage area.

14. The system of claim 13, wherein the initiation request carries an indication of distance between the first base station and the WCD, and wherein determining that the WCD is threshold far away from the first base station comprises comparing the indicated distance with a distance threshold.

15. The system of claim 14, wherein the indication of distance comprises an indication of how long it takes for a pilot signal from the first base station to reach the WCD, whereby the indication of how long it takes for the pilot signal from the first base station to reach the WCD corresponds with distance between the first base station and the WCD.

16. The system of claim 14, wherein the distance threshold is a cell radius.

17. The system of claim 13, wherein determining that the WCD is threshold far away from the first base station comprises using a location of the WCD and a location of the first base station to determine a distance between the WCD and the first base station, and comparing the determined distance with a distance threshold.

18. The system of claim 13, wherein establishing the communication simultaneously in the first coverage area and in the second coverage area comprises applying a channel assignment into soft handoff (CASHO) process.

19. The system of claim 13, wherein waiting to detect that the second base station has received adequate bearer traffic from the WCD via the second coverage area comprises waiting to determine that the second base station has received a threshold number of good traffic frames from the WCD via the second coverage area.

20. The system of claim 13, wherein discontinuing the communication in the first coverage area while allowing the communication to continue in the second coverage area comprises sending to the WCD a directive to discontinue the communication in the first coverage area.

\* \* \* \* \*